US005581741A

United States Patent [19]
Clark et al.

[11] Patent Number: 5,581,741
[45] Date of Patent: Dec. 3, 1996

[54] PROGRAMMABLE UNIT FOR CONTROLLING AND INTERFACING OF I/O BUSSES OF DISSIMILAR DATA PROCESSING SYSTEMS

[75] Inventors: Alan R. Clark, Endicott; Sivarama K. Kodukula, Vestal, both of N.Y.

[73] Assignee: International Business Machines Corporation, Armonk, N.Y.

[21] Appl. No.: 341,848

[22] Filed: Nov. 16, 1994

Related U.S. Application Data

[63] Continuation of Ser. No. 975,367, Nov. 12, 1992, abandoned.

[51] Int. Cl.$^6$ .................................................. G06F 13/38
[52] U.S. Cl. ............................................................ 395/500
[58] Field of Search ................................. 395/500, 200, 395/275, 306, 307, 308, 309, 310

[56] References Cited

U.S. PATENT DOCUMENTS

| | | | |
|---|---|---|---|
| 3,940,743 | 2/1976 | Fitzgerald | 395/309 |
| 4,309,754 | 1/1982 | Dinwiddie, Jr. | 395/307 |
| 4,586,159 | 4/1986 | Thomas et al. | 395/325 |
| 4,709,328 | 11/1987 | Anthony, Jr. et al. | |
| 4,716,527 | 12/1987 | Graciotti | 395/307 |
| 4,855,905 | 8/1989 | Estrada et al. | |
| 4,864,496 | 9/1989 | Triolo et al. | 395/306 |
| 4,991,085 | 2/1991 | Pleva et al. | |
| 5,029,074 | 7/1991 | Maskas et al. | 395/325 |
| 5,043,877 | 8/1991 | Berger et al. | |
| 5,083,259 | 1/1992 | Maresh et al. | 395/306 |
| 5,129,062 | 7/1992 | Gygi et al. | 395/309 |
| 5,191,653 | 3/1993 | Banks et al. | 395/275 |

OTHER PUBLICATIONS

"System/9370 I/O Bus to Micro Channel Attachment" Boguski et al; IBM Tech Disclosure Bulletin; vol. 33 No. 5; Oct. 1990; pp. 326–328.

"Interfacing Industrial Computers to the Personal Computer Standard Bus" Adams et; IBM Tech Disc Bltn; vol. 33 No. 3A; Aug. 1990; pp. 274–275.

"Micro Channel/Multibus–II Interface" by D'Ambrose et al; IBM Technical Disclosure Bulletin; vol. 33 No. 3B; Aug. 1990; pp. 409–411.

"Async Workstation Subsystem Capacity Enhancement Via Port Arbitration" Carissimo et; IBM Bltn; vol. 34 No. 3; Aug. 1991; pp. 98–103.

"Micro Channel Planar to Adapter Card Interrupt Redirection" Dean et al; IBM Tech Disc Bulletin; vol. 34 No. 3; Aug. 1991; pp. 392–393.

*Primary Examiner*—Richard L. Ellis

[57] ABSTRACT

A programmable I/O bus adapter for interfacing and controlling two data processing systems having dissimilar and incompatible architectures. The programmable I/O bus adapter is capable of controlling the I/O bus and adapters of each of the two data processing systems. Simultaneously, the I/O bus adapter provides for interfacing and communication between the two dissimilar data processing systems. Interfacing from the bus adapter to each data processing system is provided by circuitry provided on integrated circuit chip sets specifically designed to interface with each system. The interfacing circuitry is enabled to convert signals between each system to allow for communication. Communication paths couple the adapter to the I/O bus of each system. The ability to access and control an I/O bus and adapter of each system is provided by a microprocessor having microcode instructions stored in programmable memory. The microcode provides for self-contained operation of the I/O bus adapter by enabling it to independently perform I/O control functions of the coupled systems. The microprocessor may be implemented by using a RISC architecture microprocessor device.

7 Claims, 14 Drawing Sheets

DATA TRANSFER CONTROL BLOCK 303

| S/390 STARTING ADDRESS 305 ||||
|---|---|---|---|
| BYTE COUNT 307 || COMMAND 309 ||
| | ADDR LIM ENABLE 313 | ADDR LIMIT 315 ||
| XFER STAT 317 | ADAPT STAT 319 | KEY 321 | IOP 325 |

*FIG. 3*

PROGRAMMABLE UNIT FOR CONTROLLING AND INTERFACING OF I/O BUSSES OF DISSIMILAR DATA PROCESSING SYSTEMS

This application is a continuation of application Ser. No. 07/975,367, filed Nov. 12, 1992, now abandoned.

BACKGROUND OF THE INVENTION

1. Field of the Invention

This invention relates generally to data processing system architectures, and more specifically to a programmable I/O bus adapter for coupling the I/O bus of a first data processor to the I/O bus of a second data processor so that data can be transferred back and forth between the two processors. The invention is adapted for use in circumstances where the two data processors are constructed in accordance with two substantially different computer architectures.

2. Description of the Prior Art

As the personal computer gains acceptance in the business world and in the scientific community, the need for connectivity between data processing systems has increased. However, currently existing data processing systems are organized according to one of a plurality of computer architectures. These computer architectures are often mutually incompatible, and a direct connection between two such incompatible systems will not yield meaningful results. Accordingly, various prior-art systems have been developed for the purpose of providing an interface between two data processors having incompatible architectures.

One commonly-utilized technique for providing an interface between two data processors employs a buffer storage mechanism for buffering the flow of data from one processor to another. The buffer storage mechanism may provide for bidirectional data flow. If it is desired to move a block of data from one processor to another, the block is transferred from a first processor to a buffer storage mechanism. Next, the block of data is read from the buffer storage mechanism and into the second data processor. Note that the two aforementioned transfers of data cannot take place simultaneously because all of the arriving data must be present in the buffer storage mechanism before the buffer can be read. These prior-art buffering techniques are often referred to as "store and forward" methods and/or "mailbox" methods.

Another prior art system provides an apparatus for transferring data between a master computer system having a first architecture and a slave element having a second architecture. Such a system is disclosed in U.S. Pat. No. 5,043,877, issued to Berger et al. on Aug. 27, 1991, and entitled, "Architecture Converter for Slave Elements", hereinafter referred to as Berger. The apparatus includes conversion circuitry for converting signals corresponding to the first architecture to signals corresponding to the second architecture. The conversion circuitry also has the capability of converting signals corresponding to the second architecture to signals corresponding to the first architecture.

The Berger system is designed for use with a master computer system using Extended Industry Standard Architecture (EISA) buses. The slave element uses an architecture known as Micro Channel, available from the International Business Machines (IBM) Corporation of Armonk, NY. Micro Channel is a trademark of the IBM Corp. Micro Channel computers provide a 32-bit data transfer format which is not directly compatible with EISA-type bus architecures.

While the EISA/Micro Channel conversion system is generally satisfactory, the device is designed to operate in the context of EISA and Micro Channel architectures. Furthermore, the system is adapted for use in circumstances where it is desired to employ a master element of a first architecture and a slave element of a second architecture. The master/slave system topology may not provide for optimum operational efficiency in the context of architectural combinations other than EISA/Micro Channel.

Another prior art system provides an integrated circuit chip designed to facilitate the connection of peripheral devices to a Micro Channel type architecture bus system. This system is disclosed in U.S. Pat. No. 4,991,085, issued to Pleva et al. on Feb. 5, 1991, and entitled, "Personal Computer Bus Interface Chip With Multi-Function Address Relocation Pins". The integrated circuit provides a partitioned interface so that microchannel signals and the protocol signals common to all functions are contained on a single interface chip.

Micro Channel systems use coded cycle commands in contrast to the uncoded memory I/O signals used on other types of systems, such as the IBM AT system architecture which has evolved into the de facto standard for one widely-available class of personal computers. Many basic peripheral devices for personal computers require uncoded command signals. In order to connect these devices to a Micro Channel type bus, logic must be provided to decode the bus status signals to provide the commands used and recognized by the peripheral devices.

Although the integrated circuit chip provides a useful interface for the connection of simple peripheral devices to Micro Channel buses, the chip is not designed for system applications where it is desired to connect two fully-integrated data processing systems having completely different system architectures. Such an application is beyond the capabilities of this integrated circuit chip.

An example of another prior-art system which is designed for use with peripherals and a host computer is the apparatus disclosed in Estrada et al., U.S. Pat. No. 4,855,905, issued on Aug. 8, 1989 (hereinafter referred to as Estrada). The Estrada device is an I/O controller which includes a data processing element for executing a sequence of stored program instructions. The stored program instructions control the transfer of data between specific I/O devices and the host computer. However, for reasons similar to those discussed above in conjunction with the Pleva patent, the Estrada device is not well suited for circumstances where it is desired to connect two fully-integrated data processing systems employing different bus architectures.

One technique for interconnecting two different data processing systems is described in U.S. Pat. No. 4,709,328, issued to Anthony, Jr., et al., on Nov. 24, 1987, and entitled, "Composite Data Processing System Using Multiple Standalone Processing Systems", hereinafter referred to as Anthony. The Anthony system interconnects the data processing systems into a single composite system by using a shared, dual-port memory area in the address space of each individual data processing system. A virtual channel is used to generate interrupts so that each data processing system can control the other. Each data processing system has the capacity to execute standalone programs.

The Anthony device includes a channel bus coupled to a host processor. The channel bus is adapted for connection to a plurality of I/O hardware adapters for the purpose of transferring I/O data and commands between the host processor and a plurality of I/O devices controlled by I/O hardware adapters. A virtual channel adapter is connected to the channel bus. The virtual channel adapter receives channel activation signals from the host processor, and produces control signals in response to the channel activation signals.

The purpose of the Anthony device is to provide a technique for the connection of a relatively complex business-type host computer system to a basic personal computer auxiliary system. Such personal computer systems frequently utilize one of three relatively simple I/O bus structures commonly known as the PC, XT, and AT systems. In this manner, the personal computer can be used to perform multiple functions for the host computer. However, the Anthony system is not well adapted for use in conjunction with Micro Channel systems, which use a relatively complicated asynchronous bus configuration.

Micro Channel systems offer significant performance advantages, and are particularly well-suited for certain specific types of system applications, as compared with conventional PC, AT, and XT systems. It would be desirable to have a technique for interconnecting two different data processing systems which is adaptable to relatively complex architectures, such as, for example, the Micro Channel environment.

Presently-existing Micro Channel processing systems include a planar processor for executing instructions, together with a memory device. A microchannel communications link provides an interface between the planar processor and one or more communications ports which are, for example, SCSI buses and/or local area network ports. One or more Micro Channel I/O adapters may be used in conjunction with the microchannel communications link.

Existing techniques which are applicable to Micro Channel environments do not offer optimum efficiency and speed, because many tasks are delegated to the Micro Channel planar processors. These tasks include IBM System S/390 I/O channel and control unit emulation. The execution of these tasks by the planar processors significantly reduces Micro Channel system performance.

What is needed is an improved system for providing a processor-to-processor interface. The interface should enable faster data transfer rates between the two processors than is currently possible with existing system topologies. It is also desirable to provide an improved interface mechanism which enables multiple, concurrent, independent processor to processor operations. The interface should include facilities for emulating the channel and the control unit so that the planar processor of the Micro Channel can be utilized more efficiently.

SUMMARY OF THE INVENTION

In accordance with the present invention, there is provided a new and improved smart bus control unit which implements I/O control functions. The invention is employed in the context of two data processing systems. A first data processing system uses Micro Channel architecture and a Micro Channel bus. One or more Micro Channel I/O adapters are connected to the Micro Channel bus to provide for the connection of I/O devices to the Micro Channel bus. A second data processing system includes a bus having an architecture which is incompatible with the Micro Channel system.

The smart bus control unit of the present invention contains interfacing means for interfacing the first data processing system with the second data processing system. The interfacing means provides for the connection of the Micro Channel bus to the bus of the second data processing system. Access means are provided to enable the smart bus control unit to directly access one or more of the Micro Channel I/O adapters. The access means comprises a microprocessor having direct access to a plurality of Micro Channel I/O adapter components. In this manner, data processing systems employing Micro Channel architecture may be used with other types of data processing systems, including the system commonly known as IBM System/390.

In a preferred embodiment of the invention, the smart bus control unit includes control means for controlling the operation of a Micro Channel bus containing at least one I/O adapter. The control means includes microcode instructions which are executed by the microprocessor device of the access means. The microcode instructions provide for the performance of at least one I/O function on the I/O adapter and/or the Micro Channel bus. The microcode provides for self-contained bus control unit operation by enabling the smart bus control unit to independently perform one or more channel functions. In this manner, the adapter access means offers efficient data transfers between a plurality of I/O adapters.

A further embodiment of the invention implements the microprocessor by using a RISC-type microprocessor device. A single, dedicated control card is used for the Micro Channel I/O adapter. The use of such a control card provides the Micro Channel planar data processor with the capability of supporting additional installed I/O adapters. These I/O adapters include means for operating the I/O bus functions of the first data processing system 107, which, for example, may be the Micro Channel system. The access means operates using a Micro Channel bus master access device and previously-architected Subsystem Control Block (hereinafter referred to as "SCB") protocols. The smart bus control unit supports Micro Channel SCB architectures to allow peer-to-peer communications between adapters.

The bus master access device and/or the interfacing means may include custom integrated circuit chip sets. The invention may also include addressing means for supporting ESA addressing modes. 32-bit data streaming is provided, permitting up to 40 megabyte per second data transfer rates on the Micro Channel.

For a better understanding of the present invention, together with other and further advantages and features thereof, reference is made to the following description taken in conjunction with the accompanying drawings, the scope of the invention being pointed out in the appended claims.

BRIEF DESCRIPTION OF THE DRAWINGS

FIG. 3 is a block diagram showing the data structures used to implement the storage operations performed by the smart bus control unit of FIG. 1.

DETAILED DESCRIPTION OF THE PREFERRED EMBODIMENTS

The following are trademarks of the IBM Corporation: MICRO CHANNEL, AT, XT, S/390, SYSTEM/370, and SYSTEM/390.

Figure 1:
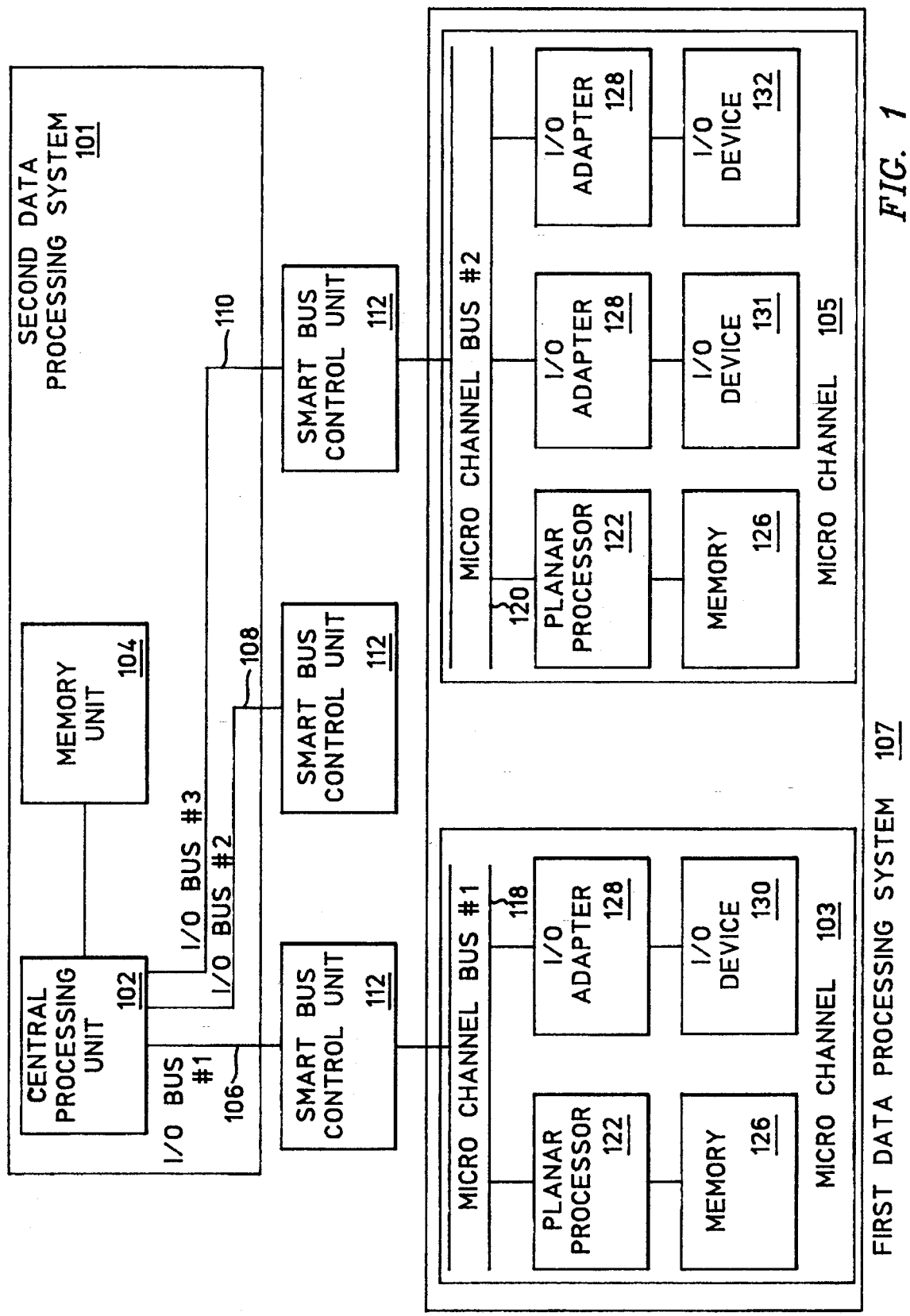
FIG. 1 is a hardware block diagram illustrating the operational environment of the smart bus control unit of the present invention.

FIG. 1 is a hardware block diagram illustrating the operational environment of the smart bus control unit 112 of the present invention. The smart bus control unit 112 functions as an interface between a first data processing system 107 and a second data processing system 101. The first data processing system 107 employs Micro Channel architecture, and includes Micro Channel 103 and/or Micro Channel 105. The basic operation of Micro Channel systems is well known to those skilled in the art. The second data processing system 101 employs an architecture incompatible with Micro Channel protocol.

Each Micro Channel 103, 105 of the first data processing system 107 includes a Micro Channel bus. For example, Micro Channel 103 uses Micro Channel bus #1 (reference 118), and Micro Channel 105 uses Micro Channel bus #2 (reference 120). Each Micro Channel bus 118, 120 is connected to a planar processor 122 and one or more I/O adapters 128. The planar processors 128 are provided with electronic memory denoted as memory 126. Each I/O adapter 128 is designed to accommodate an I/O device 130, 131, 132.

The second data processing system 101 includes a central processing unit (CPU) 102, and a memory unit 104. The CPU 102 is connected to one or more I/O buses, such as I/O bus #1 (reference 106), I/O bus #2 (reference 108), and I/O bus #3 (reference 110). I/O buses #1, #2, and #3 (106, 108, and 110, respectively), employ a protocol which is physically and logically incompatible with Micro Channel architecture.

In a preferred embodiment of the present invention, the second data processing system 101 is an IBM S/390 system, and I/O buses #1, #2, and #3 convey information consistent with the operation of an S/390 system as architected. The basic overall operation of IBM S/390 systems is generally known to those skilled in the art.

The smart bus control unit 112 (FIG. 1) of the present invention permits communications to occur between the first and second data processing systems 107, 101, respectively. Direct connection between the IBM S/390 I/O buses #1 (106), #2 (108), or #3 (110) and the Micro Channel buses 118 or 120 is not possible because the S/390 buses have a different number of lines than the Micro Channel buses. Furthermore, the IBM S/390 system follows select cycle and data cycle concepts for passing address information, the length of the transfer, and the data. Accordingly, it is necessary to reformat or reorganize data before transferring the data from one data processing system (i.e., first data processing system 107) to the second data processing system (i.e., second data processing system 101).

Due to recent developments in Micro Channel 103, 105 I/O technology, use of the smart bus control unit 112 to interface an IBM S/390 system 101 with a Micro Channel 103, 105 system is especially advantageous. By combining Micro Channels 103, 105 with an IBM S/390 data processing system 101, a relatively compact, low-cost integrated data processing system is provided. The smart bus control unit 112 allows processing of S/390 I/O instructions while supporting all currently architected addressing modes of IBM S/390 computers.

The smart bus control unit 112 contains interfacing means for interfacing the first data processing system 107, such as Micro Channel 103 and/or Micro Channel 105, with the second data processing system 101. Each smart bus control unit 112 is connected to an I/O bus, such as I/O bus #1 (106), I/O bus #2 (108), or I/O bus #3 (110). Each smart bus control unit 112 interfaces with a Micro Channel 103, 105 via a Micro Channel bus, such as Micro Channel bus #1 (reference 118), or Micro Channel bus #2 (reference #120). I/O bus #1 (106), I/O bus #2 (108), I/O bus #3 (110), Micro Channel bus #1 (reference 118), and Micro Channel bus #2 (reference #120) each include a plurality of lines for the transfer of address information, control information, and data.

The smart bus control unit 112 includes access means which enable the smart bus control unit 112 to access one or more Micro Channel I/O adapters 128 over the Micro Channel 118. The access means comprises a microprocessor having direct access to a plurality of Micro Channel I/O adapter 128 components. In this manner, data processing systems employing Micro Channel architecture, such as Micro Channel 103 and/or Micro Channel 105, may be used with other types of data processing systems, including IBM S/390.

The smart bus control unit 112 includes control means for controlling the operation of at least one of the I/O adapter 128 and the Micro Channel bus 118 or 120. The control means includes microcode instructions which are executed by the microprocessor 206 device of the access means. The microcode instructions provide for the performance of at least one I/O function on the I/O adapter 128 and/or the Micro Channel bus 118 or 120.

The microcode provides for self-contained bus control unit 112 operation by enabling the smart bus control unit 112 to independently perform one or more channel functions. All of the IBM S/390 channel functions are performed by the microcode executed in conjunction with the smart bus control unit 112. Independent and concurrent planar processor 128 operations are allowed, thus minimizing Micro Channel 103, 105 traffic and permitting the Micro Channels 103, 105 to operate at relatively high efficiency. The microcode is structured on one common hardware platform, and the functions implemented by the microcode are allocated between the smart bus control unit 112 and the planar processor 122. The microcode is relatively flexible, to permit the emulation of other types of IBM S/390 control units which may be developed in the future. In this manner, the adapter access means offers efficient data transfers between a plurality of I/O adapters 128.

A further embodiment of the invention implements the microprocessor by using a RISC-type microprocessor device. The smart bus control unit 112 is fabricated on a single, dedicated control card. The use of such a control card provides the Micro Channel planar data processor 122 with the capability of supporting a plurality of installed I/O adapters 128. The smart bus control unit 112 includes emulation means for emulating the I/O bus 106, 108, 110 functions of the data processing system, which, for example, may be the IBM S/390. The access means of the smart bus control unit 112 operates using a Micro Channel bus master access device and previously-architected Subsystem Control Block (hereinafter referred to as "SCB") protocols. The smart bus control unit 112 supports Micro Channel SCB architecture to allow peer-to-peer communications between I/O adapters 128 and/or other smart bus control units 112 residing on the same Micro Channel 103, 105.

The bus master access device and/or the interfacing means may include custom integrated circuit chip sets. The invention may also include addressing means for supporting IBM S/390 ESA addressing modes. 32-bit data streaming is provided, permitting up to 40 megabyte per second data transfer rates on the Micro Channel.

Figure 2:
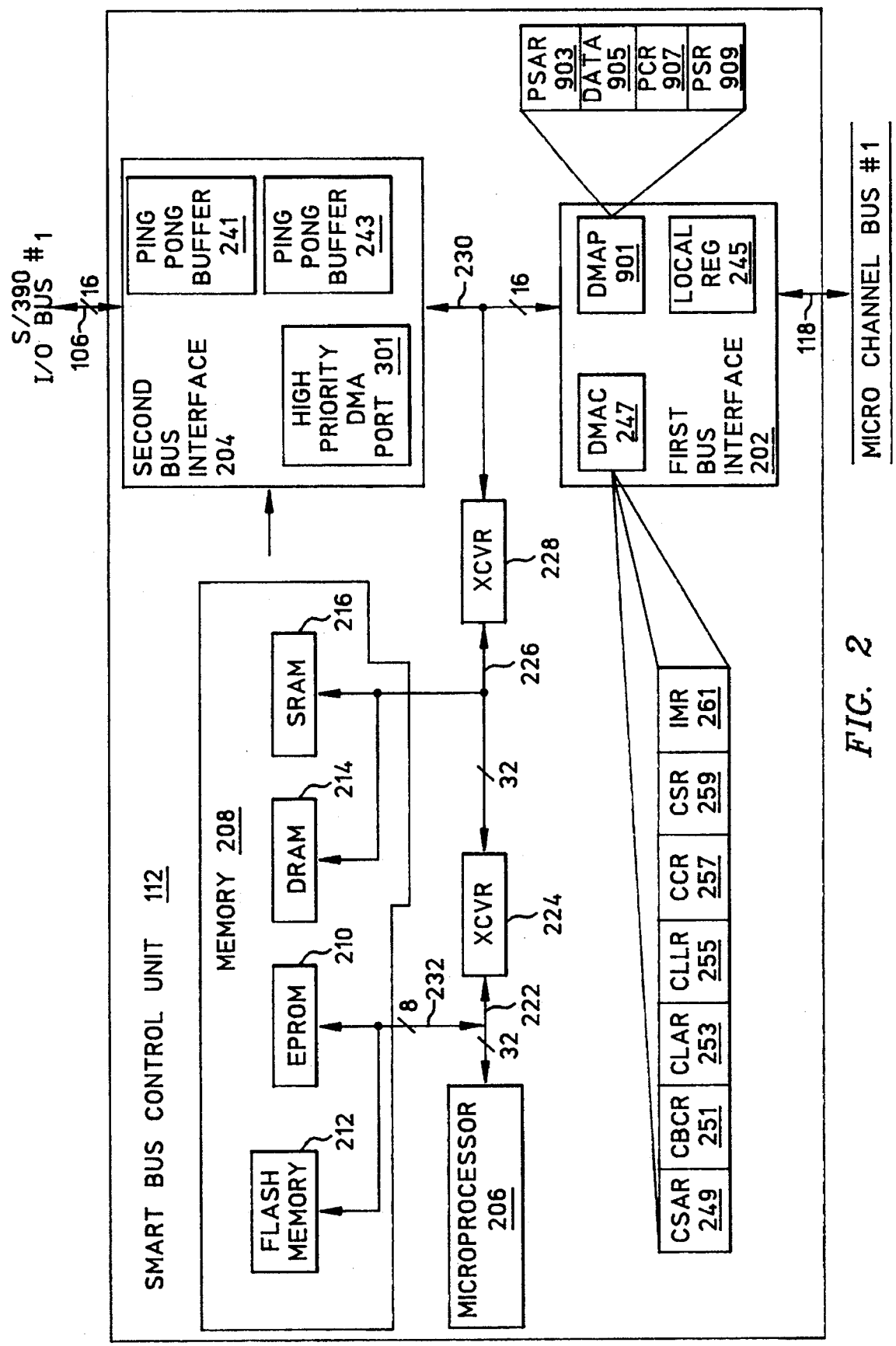
FIG. 2 is a hardware block diagram for the smart bus control unit shown in FIG. 1.

FIG. 2 is a hardware block diagram for the smart bus control unit 112 shown in FIG. 1. The smart bus control unit 112 contains a first bus interface 202, a second bus interface 204, a microprocessor 206, and memory 208.

In a preferred embodiment of the invention, the first data processing system 107 bus interface 202 is implemented using a Micro Channel Bus Master chip set available from the Intel Corp. of Cupertino, Calif. as part number 82325. The second bus interface 204 is designed to interface with an IBM S/390 system. The microprocessor 206 is a RISC processor such as the Intel I80960CA microprocessor integrated circuit. The memory 208 includes EPROM memory 210, flash memory 212, dynamic random access memory (DRAM) 214, and static random access memory (SRAM) 216.

The first bus interface 202 includes a local register 245 of 64-byte capacity and a DMA channel (DMAC) 247 to implement data transfers. The DMAC 247 includes a 32-bit system address register (CSAR) 249, a 24-bit, byte count register (CBCR) 251, a 24-bit local address register (CLAR) 253, a 24 bit linked list pointer (CLLP) 255, an 8-bit control register (CCR) 257, an 8-bit status register (CSR) 259, and an interrupt mask register (IMR) 261. The first bus interface 202 also includes a DMAP facility 901. The DMAP facility 901 includes a system address register (PSAR) 903, a data register (DATA) 905, a control register (PCR) 907, and a status register (PSR) 909. The purpose for the DMAC 247 and DMAP 901 facilities will be described in greater detail with reference to the description of FIGS. 5–8.

The second bus interface 204 provides transport mechanisms for all S/390 messages and data transfers between the second data processing system 101 and the Micro Channels 103, 105 (FIG. 1). The second bus interface 204 includes two internal 64-byte ping pong buffers 241, 243, and a high priority DMA port 301. All messages, as well as data transfers, are executed by the smart bus control unit 112. Data transfers from the second data processing system 101 may be directed to smart bus control unit DRAM 214 or SRAM 216 (FIG. 2). These data transfers may alternatively be routed directly to the first bus interface 202 for transfers directly to/from another Micro Channel 103, 105 (FIG. 1) device such as another smart bus control unit 112, an I/O adapter 128, and/or planar memory 126. The second bus interface 204 is configurable for all currently architected S/370, EA, and ESA addressing modes.

Returning to FIG. 2, the smart bus control unit 112 uses a plurality of buses to transfer data between Micro Channel bus #1 (reference 118), S/390 I/O bus #1 (reference 106), microprocessor 206, and/or memory 208. For example, the microprocessor 206 is connected to the first bus interface 202 and the second bus interface 204 via a first 32-bit bus (reference 222), a first transceiver 224, a second 32-bit bus (reference 226), a second transceiver 228, and a 16-bit bus (reference 230). The first and second data processing system bus interfaces 202, 204 are connected together via this 16-bit bus (reference 230).

A second path 234 from the microprocessor 206 to the second bus interface 204 leads directly from the second 32-bit bus (reference 226) to the second bus interface 204 without traversing the second receiver 228. The microprocessor 206 accesses flash memory 212 and EPROM memory 210 via the first 32-bit bus (reference 222), and an 8-bit bus (reference 232). DRAM 214 and SRAM 216 are accessed through the second 32-bit bus (reference 226).

The S/390 I/O bus #1 (reference 106) provides a physical connection between the second data processing system 101 (FIG. 1), such as an IBM S/390 data processing system, and the second bus interface 204 (FIG. 2). The invention includes the capability to independently pass messages or data in either direction between the second data processing system 101 and the second bus interface 204. In addition, facilities are included within the second bus interface 204 for the purpose of storing and transmitting error information to the second data processing system 101 as well as for general bus controls as set by the second data processing system 101.

The origination and destination of a message or a block data transfer is generally denoted by the direction of the transfer. A down operation refers to transfers from the second data processing system 101 to the second bus interface 204. A down message is defined as a message generated by the second data processing system 101 and fetched into local storage in the second bus interface 204. An up message indicates message transfers from the second bus interface 204 in the direction of the second data processing system 101. Data block transfers in the up direction are towards the second data processing system 101. Data block transfers in the down direction are from the second data processing system 101 and towards the second bus interface 204.

The S/390 I/O bus #1 (reference 106) enables the performance of the following functions: (1) transmitting down messages from the second data processing system 101 (FIG. 1) memory unit 104 directed to the second bus interface 204 internal down message array; (2) receiving up messages from the second bus interface 204 directed to an internal queue within the second data processing system 101 (FIG. 1); (3) implementing fetch operations from the second data processing system memory unit 104 (FIG. 1) to the second bus interface 204 internal ping-pong array 241, 243 (FIG. 2); (4) implementing store data transfers to the memory unit 104 (FIG. 1) and the second bus interface 204 internal ping-pong array 241, 243; (5) transmitting sense information to the second data processing system 101 (FIG. 1); and (6) transmitting control information from the second data processing system 101.

The first 32-bit bus (reference 222), first transceiver 224, second 32-bit bus (reference 226), second transceiver 228, 16-bit bus (reference 230), second path 234, and 8-bit bus (reference 232) together comprise a local processor bus. The local processor bus operates such that the microprocessor 206 and the first bus interface 202 function as masters. The memory 208 and the second bus interface 204 act as slave devices.

The microprocessor 206 accesses the DRAM 214 over the local processor bus to execute functional and diagnostic microcode operations. The microprocessor 206 also accesses the flash memory 212 and the EPROM 210 over the local processor bus. The internal ping pong buffers 241, 243 of the second bus interface 204 are accessed by the microprocessor 206 over the local processor bus. The local processor bus also provides the microprocessor 206 with access to the first bus interface 202 local register 245. DRAM 214 access by the microchannel bus #1 (118) occurs across the local processor bus. The first bus interface 202 fetches link lists over the local processor bus. The 16-bit bus 230 is used to transfer data in and out of the second bus interface 204 internal ping pong buffers 241, 243 to the Micro Channel bus #1 (118). Hence, this 16-bit bus 230 can be referred to as a bypass bus.

The first bus interface 202 physically interfaces with Micro Channel bus #1 (118). This bus interface 202 provides facilities for each of the signals and data buses used on the Micro Channel Bus #1 (118). Various data operations take place on the Micro Channel Bus #1 (118), such as access to the registers of the second bus interface 204 during initial system setup. The Micro Channel Bus #1 (118) may be used to perform both master and slave operations. Master operations are initiated, for example, by the first bus interface 202. Slave operations are implemented using the planar processor 122 or another Micro Channel 103, 105 to access DRAM 214 and/or SRAM 216.

The smart bus control unit 112 (FIG. 1) can be programmed to perform either storage operations or message operations. Storage operations are programmed to be either IBM S/390 stores or IBM S/390 fetches which use identical facilities in the second bus interface 204. Message operations use separate control facilities, depending upon whether the operation is a message store (up message) or a message fetch (down message). This results from the fact that a down message may be an internal operation to the second bus interface 204 which allows the second data processing system 101 to obtain information about the smart bus control unit 112 status or set controls. Normal up and down messages are external operations and require service from the local microprocessor 206.

Storage handling operations are performed using the second bus interface 204 DMA ports, such as DMA priority port 301 (FIG. 3), and/or the DMAC 247 provided by the first bus interface 202 (FIG. 2). Bus interface 204 provides three data control blocks for controlling data transfers. These blocks include a data control block used in conjunction with DMA priority port 301 (FIG. 3), and two control blocks used in conjunction with ping pong buffers 241 and 243 (FIG. 2). These three data control blocks employ a data structure to be described hereinafter with reference to FIG. 3.

FIG. 3 illustrates the data structures for the data control blocks which are transferred between S/390 I/O bus #1 (FIG. 2, 106), and at least one of the microprocessor 206 and the memory 208, via the second bus interface 204. The second bus interface 204 includes a high priority DMA port 301. This port 301 may be used for any data transfer of up to 64 bytes between the control unit DRAM 214 or SRAM 216 (FIG. 2) and the second data processing system memory unit 104 (FIG. 1).

Referring to FIG. 3, a data control block 303 is shown which includes several data fields. An S/390 starting address field 305 contains the S/390 starting address for a specific data storage operation. The S/390 starting address corresponds to a location within memory unit 104 (FIG. 1). The data control block 303 (FIG. 3) also includes a byte count field 307, a command field 309, an address limit enable (LM ENB) field 313, an address limit field 315, an adapter status field 317, a transfer status field 319, a key field 321, and an IOP field 325. The use of these fields will be described more thoroughly hereinafter with reference to FIGS. 4 and 5.

Figure 4A:
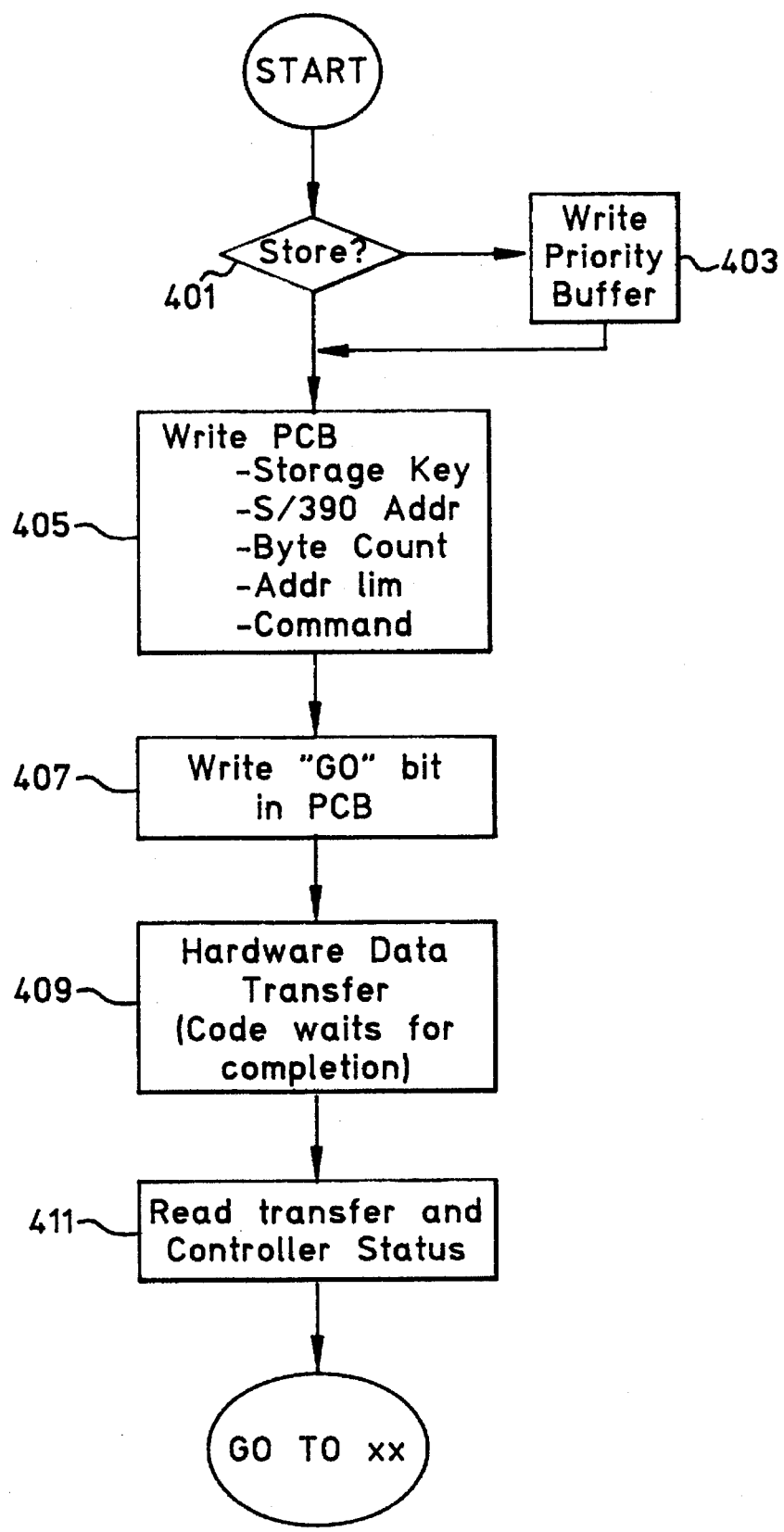
FIGS. 4A and 4B are a flowchart illustrating the sequence of operations for a data storage transfer function between an IBM S/390 data processing system and a Micro Channel system according to the technique of the present invention.
Figure 4B:
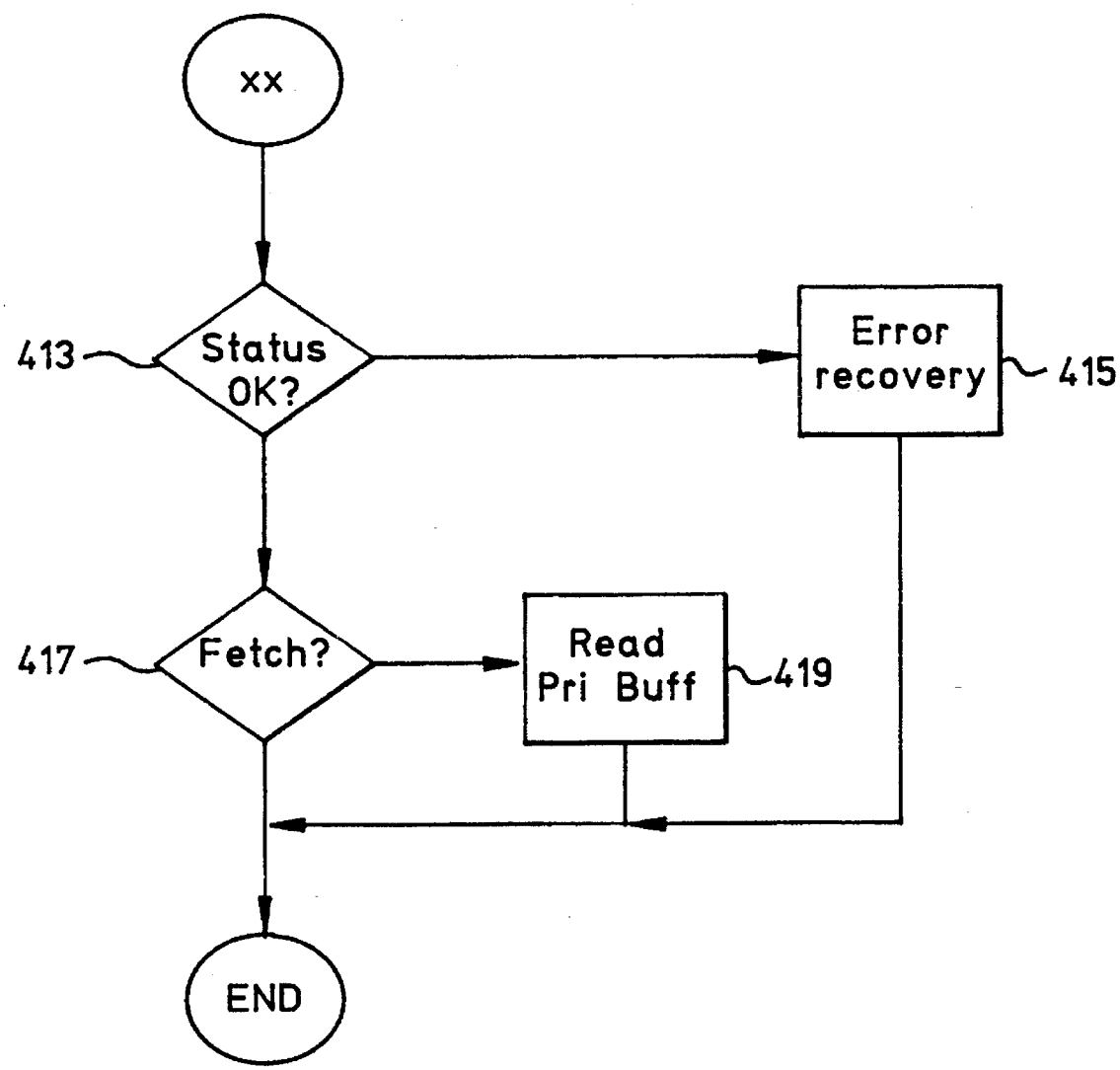

FIGS. 4A and 4B are a flowchart setting forth the procedure allowing IBM S/390 (first data processing system 101) to smart bus control unit 112 transfer. Note that this type of transfer is between the second data processing system memory unit 104 (FIG. 1) and the priority data port 301 in the second bus interface 204. Since the priority data port 301 is used, each transfer programmed is limited to 64 bytes. However, any priority port 301 operation will interrupt a transfer in progress between the second data processing system 101 and the first data processing system 107 via the ping pong buffers 241,243 and the first bus interface 202.

The program starts at block 401 (FIG. 4A), where microprocessor 206 (FIG. 2) determines the direction of the transfer. If the transfer is to be in an up direction (a store operation), then the microprocessor must write the data to be transferred to the priority buffer in the second bus interface 403. The microprocessor will then initialize the priority control block (PCB) with the initial values of the S/390 storage key, the S/390 starting storage address, a byte count, information for an address limit checking, and a command (block 405). Once the PCB is programmed, the microprocessor writes a "go" bit to the PCB command field (block 407). At this point, the second bus interface begins executing the transfer. This is accomplished entirely through hardware reading the contents of the PCB and forming appropriate select cycle data, then transferring the select cycle followed by up to 16 data cycles. When the transfer is complete, the hardware updates the control block with the final S/390 address, byte count, and status for the transfer and the adapter. The hardware will also reset the "go" bit previously set by the program to initiate the transfer and send an interrupt to the microprocessor if enabled. During this time, the microprocessor can poll the "go" bit or do other processing until it receives the interrupt. When the microprocessor recognizes that the transfer is complete, it reads the controller and transfer status (block 411) to determine the result of the transfer. If the status indicates an error (block 415), the program will execute an error recovery procedure which retries the operation and/or sends a message to the service system indicating that the hardware is inoperable. If normal status is received and if the transfer is going down (a fetch operation), the microprocessor can read the received data from the priority buffer 491.

The smart bus control unit 112 (FIG. 1) provides for the transfer of data between the second data processing system memory unit 104 (FIG. 1) and either the Micro Channel memory 126 (FIG. 1) or an I/O adapter memory. These data transfers utilize S/390 I/O bus #1 (106, FIG. 2), I/O bus #2 (108), and/or I/O bus #3 (110). The bypass bus (230, FIG. 2) and the Micro Channel (103 and/or 105) are also used.

The second bus interface 204 employs two data control blocks 303 (FIG. 3) to perform DMA operations between the second data processing system memory unit 104 (FIG. 1) and two internal ping-pong buffers 241, 243 within the second bus interface 204 (FIG. 2). The smart bus control unit microprocessor 206 may initialize one of these data control blocks 303 (FIG. 3) while the other data control block 303 is being processed by the second bus interface 204 (FIG. 2). The second bus interface 204 will execute a data transfer request after the completion of the previous operation. The completion of the previous operation is indicated by a byte count field 307 (FIG. 3) value of zero.

The two ping pong buffers 241, 243 overlap transfers on S/390 I/O bus #1 (106, FIG. 1), bus #2 (108), or bus #3 (110), and the bypass bus 230 (FIG. 2). Data between the ping pong buffers 241, 243 and the first bus interface 202 local register 245 (FIG. 2) are transferred on the bypass bus 230 using the DMA channel (DMAC) 247 provided by the first bus interface 202. The second bus interface 204 appears as an implicitly addressed device to the first bus interface 202.

Figure 5:
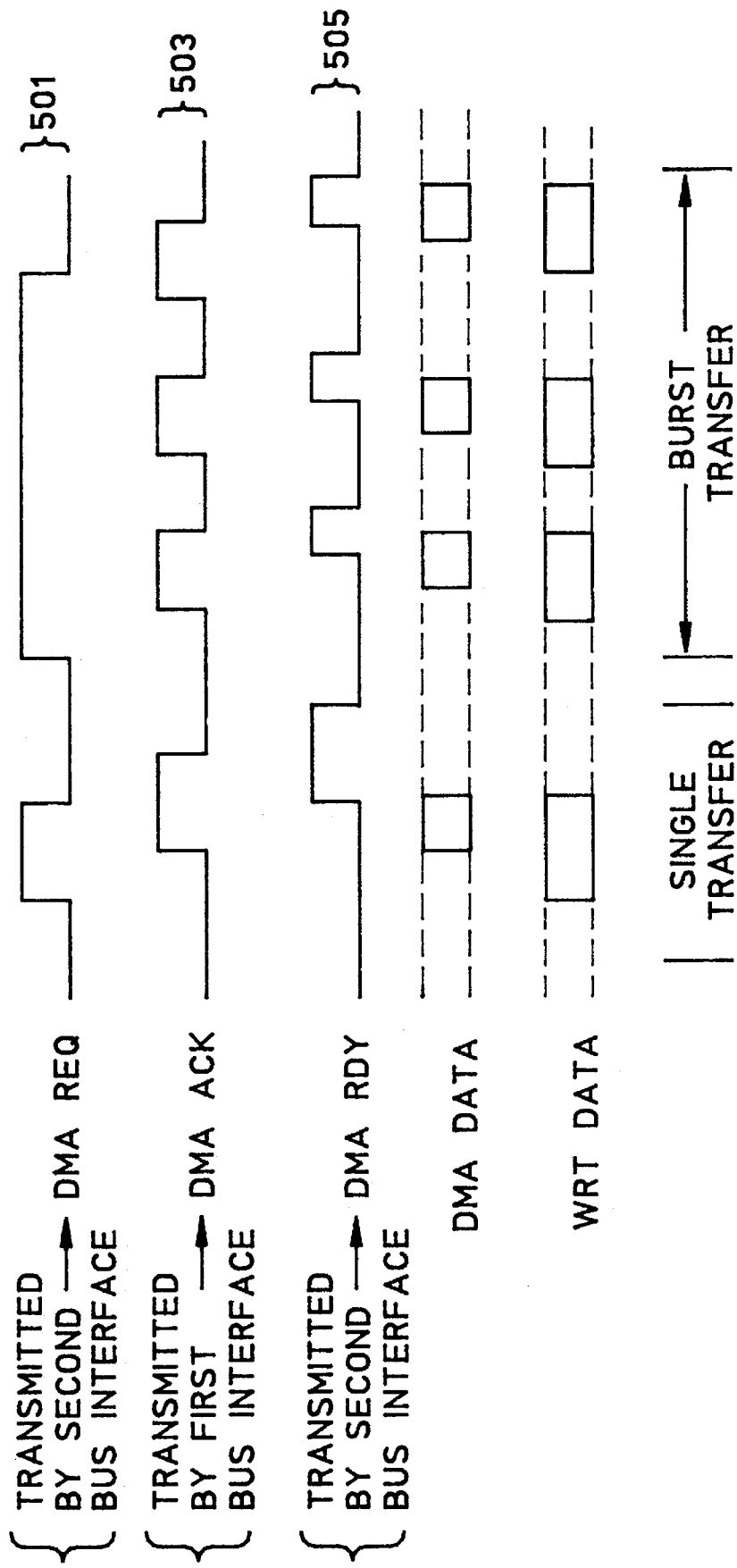
FIG. 5 is a timing diagram showing the DMA sequence on the bypass bus of the present invention.
Figure 6:
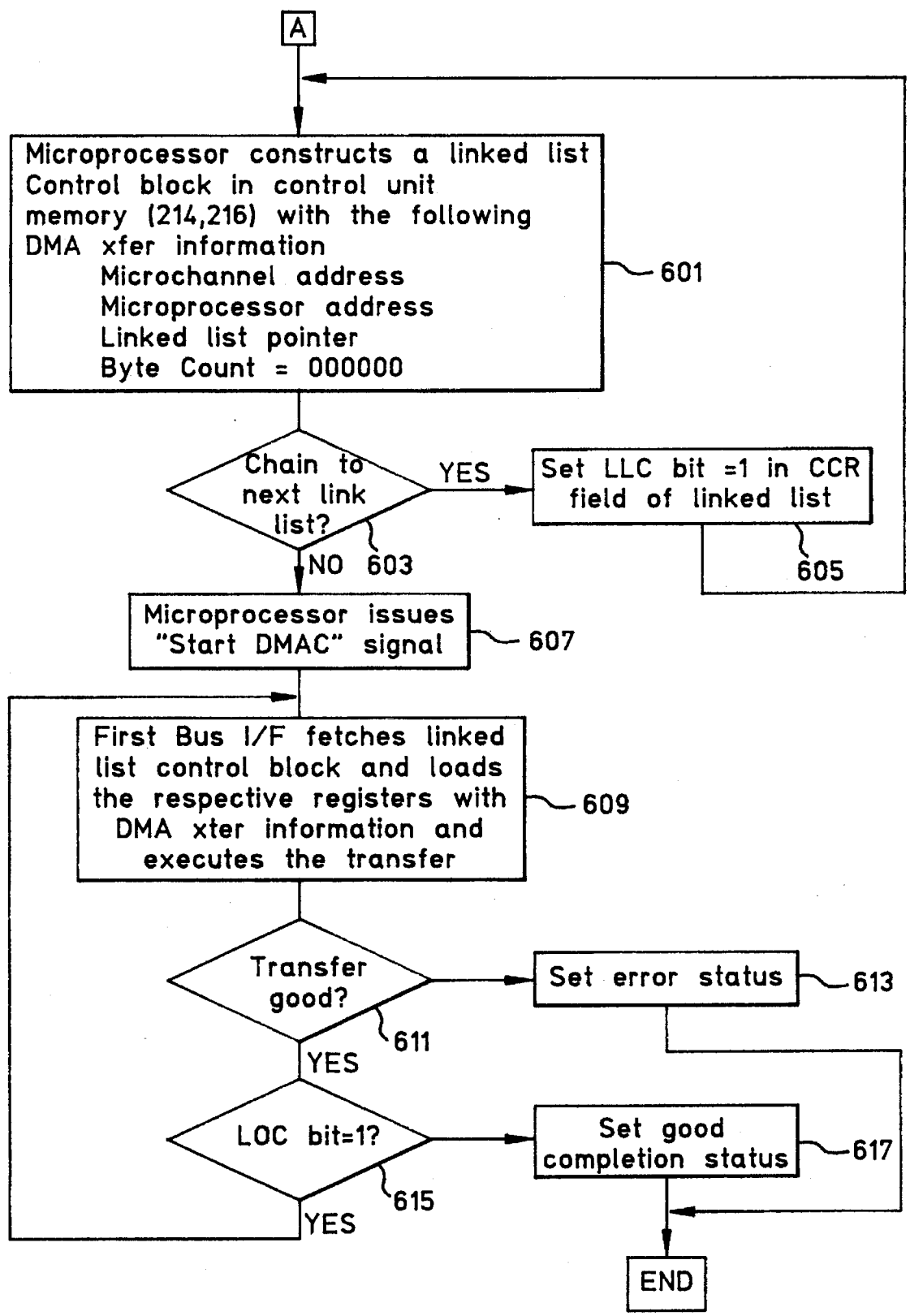
FIG. 6 is a flowchart showing the sequence of operations for the linked list mode of the DMAC shown in FIG. 2.

FIG. 5 illustrates the signals which traverse the bypass bus 230 (FIG. 2) for a data transfer between the ping pong buffers 241, 243, and the local register 245. The bypass bus signals, along with facilities provided in the first bus interface 202 and the second bus interface 204 provide a physical link to execute DMA operations as programmed in the DMAC registers 247 of the first bus interface 202. A DMA REQ signal 501 (FIG. 5) is asserted (i.e., changes from a first logic state to a second logic state) by the second bus interface 204 (FIG. 2) to request a data transfer from the first bus interface 202. The DMA ACK signal 503 (FIG. 5) is asserted by the first bus interface 202 (FIG. 2) to acknowledge receipt of the DMA REQ signal 501 (FIG. 5). The DMA ACK signal 503 remains asserted (for example, in a high logic state) until the DMA RDY signal 505 is asserted. When the DMA RDY signal 505 is asserted, the DMA ACK signal 503 is negated (i.e., reverts back to the first logic state).

The DMA RDY signal 505 is used to indicate that the data are valid during read cycles from the second bus interface 204 (FIG. 2). The DMA RDY signal 505 (FIG. 5) is also used to indicate that the data are accepted during write cycles to the second bus interface 204 (FIG. 2). Note that, for single transfers, the DMA REQ signal 501 (FIG. 5) must be negated after the DMA ACK signal 503 is asserted and before the DMA RDY signal 505 is asserted. If the DMA REQ signal 501 remains asserted after the DMA RDY signal 505 is asserted, this condition is used to imply the existence of a burst request.

DMAC 247 (FIG. 2) operations are initiated by any of two modes of program control. In a direct program control mode, the microprocessor 206 (FIG. 2) writes to all of the DMAC registers (CSAR 249, CBCR 251, CLAR 253, CLLP 255, CCR 257, and CSR 259). The microprocessor then issues a START DMAC command to the first bus interface 202. In the direct program control mode, a linked list chain bit in the CCR 257 register must be set to zero. The first bus interface 202 will ignore the contents of the CLLP 255 register. At the end of the DMAC operation, DMA BUSY status and end of transfer status are reset in the CSR 257 register. A DMAC end interrupt is requested to the microprocessor 206 if the request is not masked by the IMR register 261.

The second program control mode of DMAC 247 operations is referred to as the linked list mode. The sequence of operations for the linked list mode is set forth in the flowchart of FIG. 6. At block 601, the microprocessor 206 (FIG. 2) constructs linked list parameters for one or several transfers in a control block that resides in the DRAM 214 and/or SRAM 216 of control unit memory 208. The control block contains DMA transfer information including microchannel address, microprocessor address, linked list pointer, and byte count.

One linked list control block may point to another linked list control block. At block 603, the program performs a test to determine whether it is desired to chain a given control block to the next link list. If so, the program sets an LLC bit in the CCR 257 (FIG. 2) field of the linked list at block 605, and program control returns to block 601. The negative branch from block 603 leads to block 607, where the microprocessor 206 issues a START DMAC signal. Upon receipt of the START DMAC signal, at block 609, the first bus interface 202 fetches the first linked control block, loads the respective registers with DMA transfer information, and executes the transfer.

After the DMA transfer of block 609, the program performs two tests to determine whether or not the DMAC operation was successful. A first test is performed at block 611 to determine whether or not the DMA transfer was successful. If not, an error status bit is set at block 613, and the program exits. If the DMA transfer was successful, the affirmative branch from block 611 leads to block 615, where a test is performed to determine whether or not the LLC bit is equal to 1. Completion of the last DMA operation is indicated by an LLC bit value of zero. If LLC is equal to 1, program control loops back to block 609. If not, a good completion status bit is set at block 617, and the program exits.

Usage of the linked list mode allows the transfer of data from one contiguous S/390 memory unit 104 (FIG. 1) space to several non-contiguous sections of Micro Channel memory 126. The DMAC 247 (FIG. 2) of the first bus interface 202 can transfer data to any Micro Channel memory 126 (FIG. 1) byte address without any boundary restrictions. The only restriction on the data transfer is that the transfer length must be greater than four bytes and less than 16 megabytes.

The microprocessor 206 (FIG. 2) is not halted while the DMAC operation is in progress. The microprocessor 206 may access the memory 208 and/or the second bus interface 204 at the same time that the DMAC operation is taking place. Simultaneous microprocessor 206 access to the first bus interface 202 registers (CSAR 249, CBCR 251, CLAR 253, CLLP 255, CCR 257, CSR 259, and/or IMR 261) are also allowed. The microprocessor 206 can poll the first bus interface 202 registers to determine the completion of the current DMA cycle on the bypass bus 230.

FIGS. 7A–7D comprise a flowchart setting forth the operational sequence for a second data processing system 101 (FIG. 1) fetch operation. This operation transfers data between the memory unit 104 and the Micro Channel memory 26. In a preferred embodiment of the invention, the memory unit 104 is IBM S/390 storage. Program control commences at block 701, where the microprocessor 206 (FIG. 2) initializes the data control block 303 (FIG. 3) with the KEY field 321, the S/390 starting address field 305, and the Byte Count field 307 specified for the transfer to be performed. The command field 309 is set to specify a "fetch" operation.

Next, at block 703, the microprocessor 206 (FIG. 2) writes the adapter status field 319 (FIG. 3) to signal the second bus interface 204 (FIG. 2) to begin the data transfer by asserting the GO/-DE bit. Program control progresses to block 705, where the second bus interface 204 (FIG. 2) starts a storage operation on the S/390 I/O bus #1 (106). The storage operation commences with a select cycle followed by up to 16 data cycles.

During the initial S/390 transfers, block 707 implements an initialization process where the microprocessor 206 (FIG. 2) initializes the DMAC 247 as follows. The CSAR 249 register is set to equal the Micro Channel memory 126 (FIG. 1) address where the data are to be stored. The CBCR 251 (FIG. 2) register is set to equal the transfer length of the data, which must be equal to or less than 16 megabytes and greater than 4 bytes. If required, the CLLP 255 register is set to equal the linked list address in the smart bus control unit memory 208 (FIG. 2). The CCR 257 register is set to the transfer mode. This mode is the implicit operational mode, which specifies a transfer between the bypass bus 230 and either of Micro Channel bus #1 (118) or Micro Channel bus #2 (120).

At block 709, the microprocessor 206 (FIG. 2) issues a START DMAC command to the first bus interface 202. The second bus interface 204 transmits a DMA REQ signal to the first bus interface 202 at block 711. The DMA REQ signal is generated as soon as the first full or partial packet has arrived in the ping pong buffer 241 or 243 (FIG. 2).

Figure 7A:
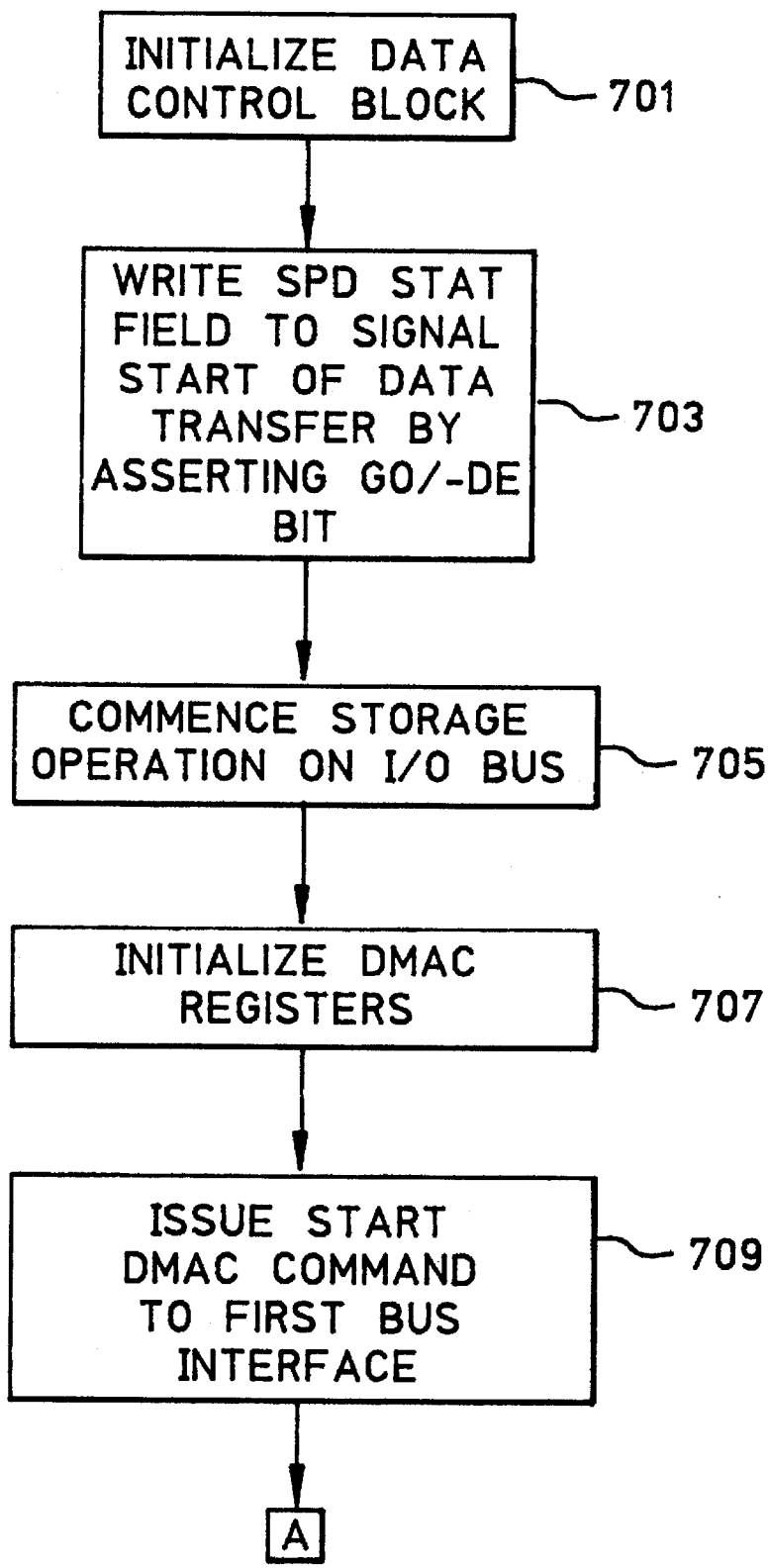
FIGS. 7A, 7B, 7C, and 7D comprise a flowchart describing a computer implemented procedure for a fetch operation according to the invention.
Figure 7B:
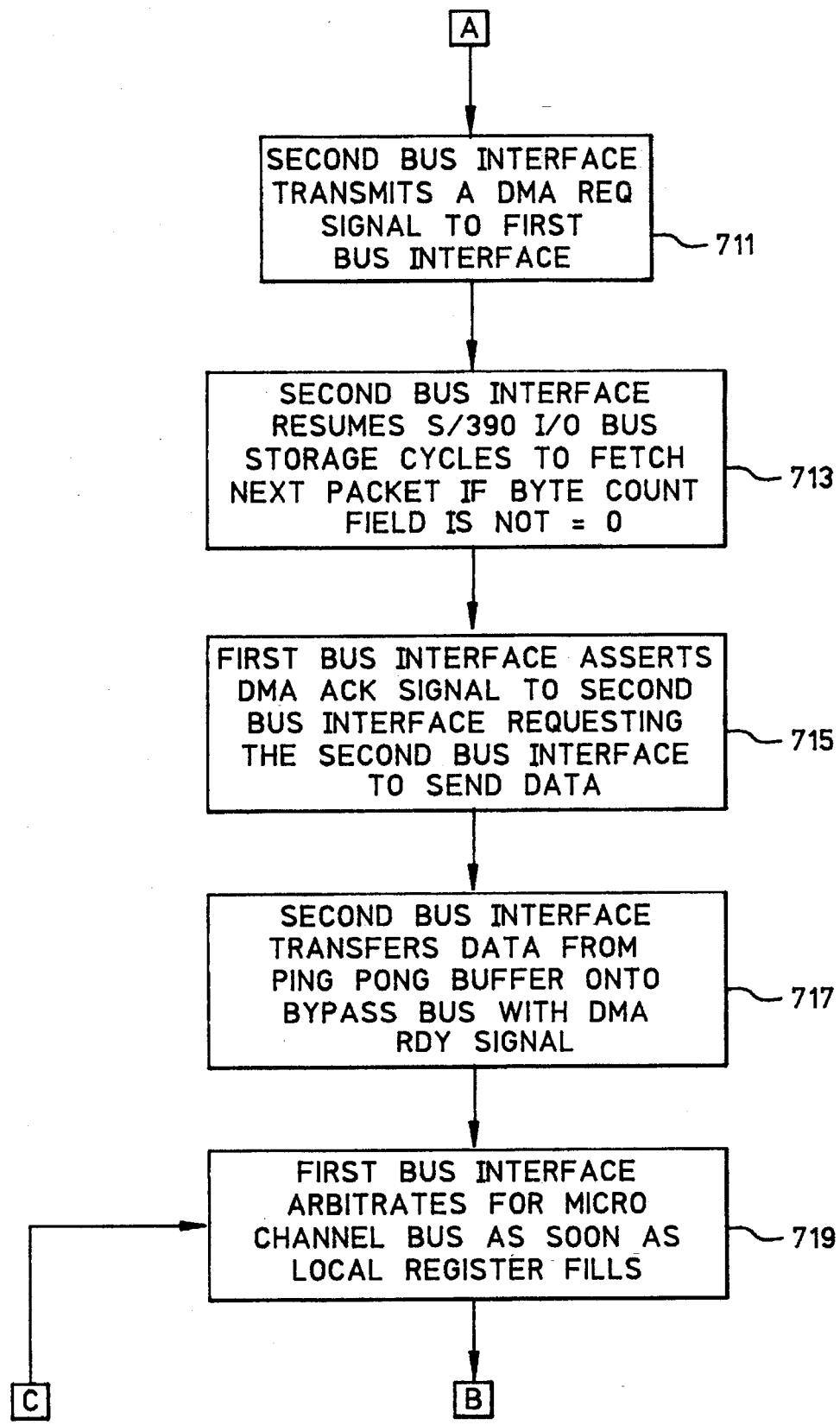

At block 715, the first bus interface 202 (FIG. 2) asserts a DMA ACK signal to the second bus interface 204, requesting the second bus interface 204 to send data. The second bus interface 204 then transfers the data from the ping pong buffer 241, 243 (FIG. 2) onto the bypass bus 230, with a DMA RDY signal (block 717). The first bus interface 202 arbitrates for Micro Channel bus #1 (118, FIG. 1) as soon as its local register 245 (FIG. 2) is filled (FIG. 7B, block 719).

Figure 7C:
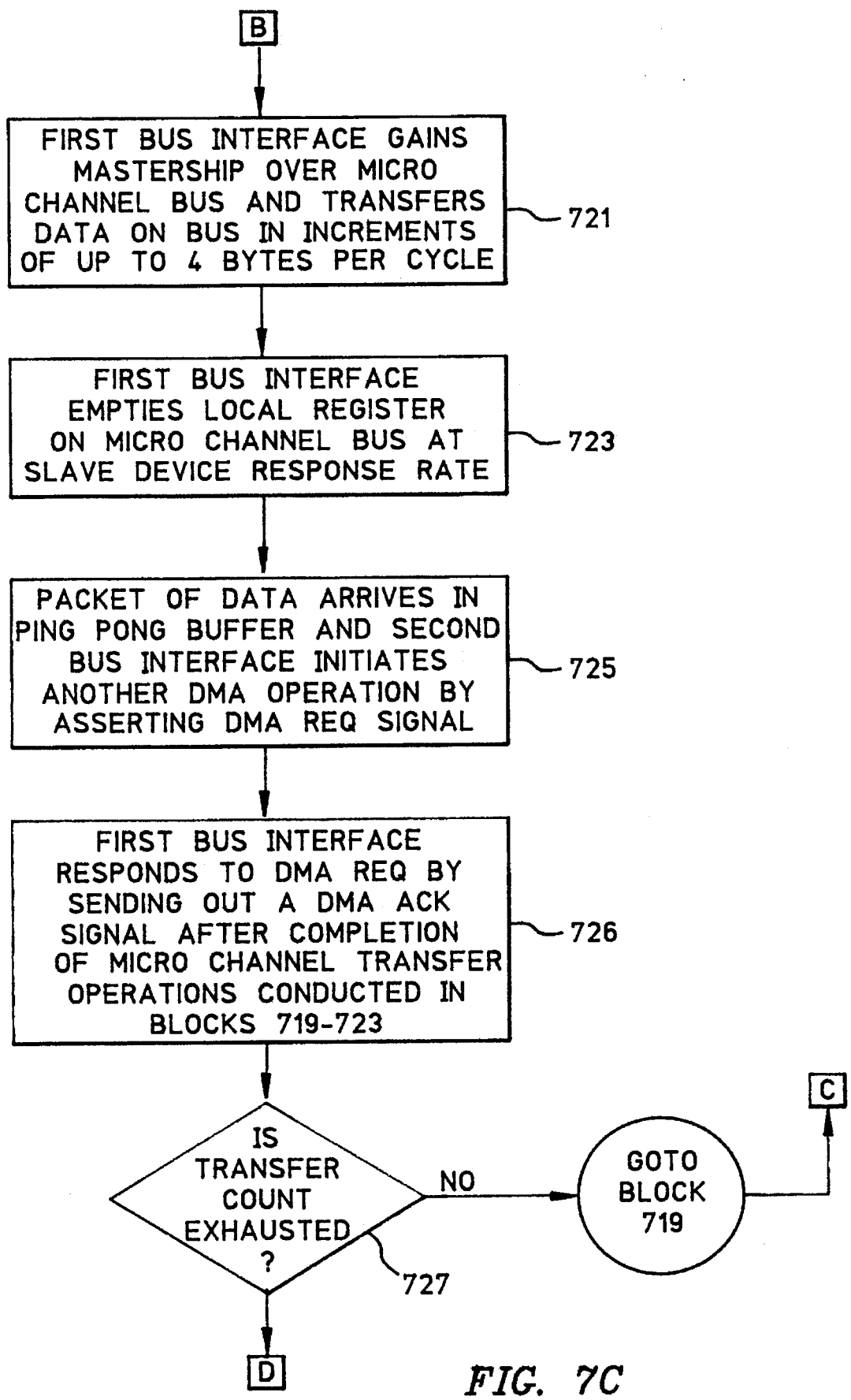
Figure 7D:
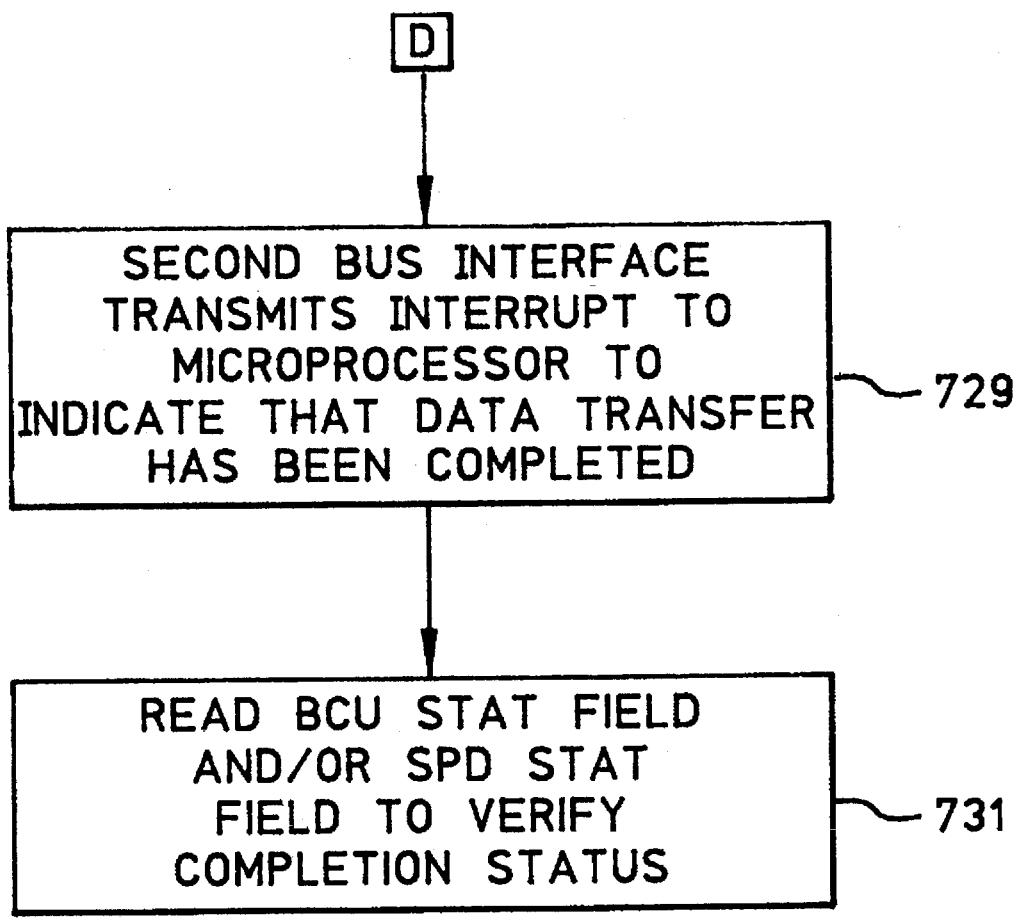

After gaining mastership, the first bus interface 202 (FIG. 2) transfers the data on Micro Channel bus #1 (118, FIG. 1) in increments of up to four bytes per cycle (FIG. 7C, block 721). The first bus interface 202 (FIG. 2) empties the local register 245 on Micro Channel bus #1 (118) at the slave device response rate (FIG. 7C, block 723).

During execution of blocks 719–723, another packet of data may arrive in the ping pong buffer 241, 243 (FIG. 2). Upon arrival of such a data packet, the second bus interface 204 initiates another DMA operation by asserting the DMA REQ signal (block 725). At block 726, the first bus interface 202 responds to this request with a DMA ACK signal after the completion of the microchannel transfer operations conducted in blocks 719–723. At block 727, a test is performed to see whether or not the transfer count is exhausted. If the transfer count is not exhausted, the program loops back to block 719. If the transfer count is exhausted, program control progresses to block 729 where the second bus interface 204 (FIG. 2) transmits an interrupt to the microprocessor 206. The interrupt serves as an indication that the data transfer has been completed. The microprocessor 206 may read the transfer status field 317 and/or the adapter status field 319 (FIG. 3) at block 731 to verify the completion status if desired.

Figure 8A:
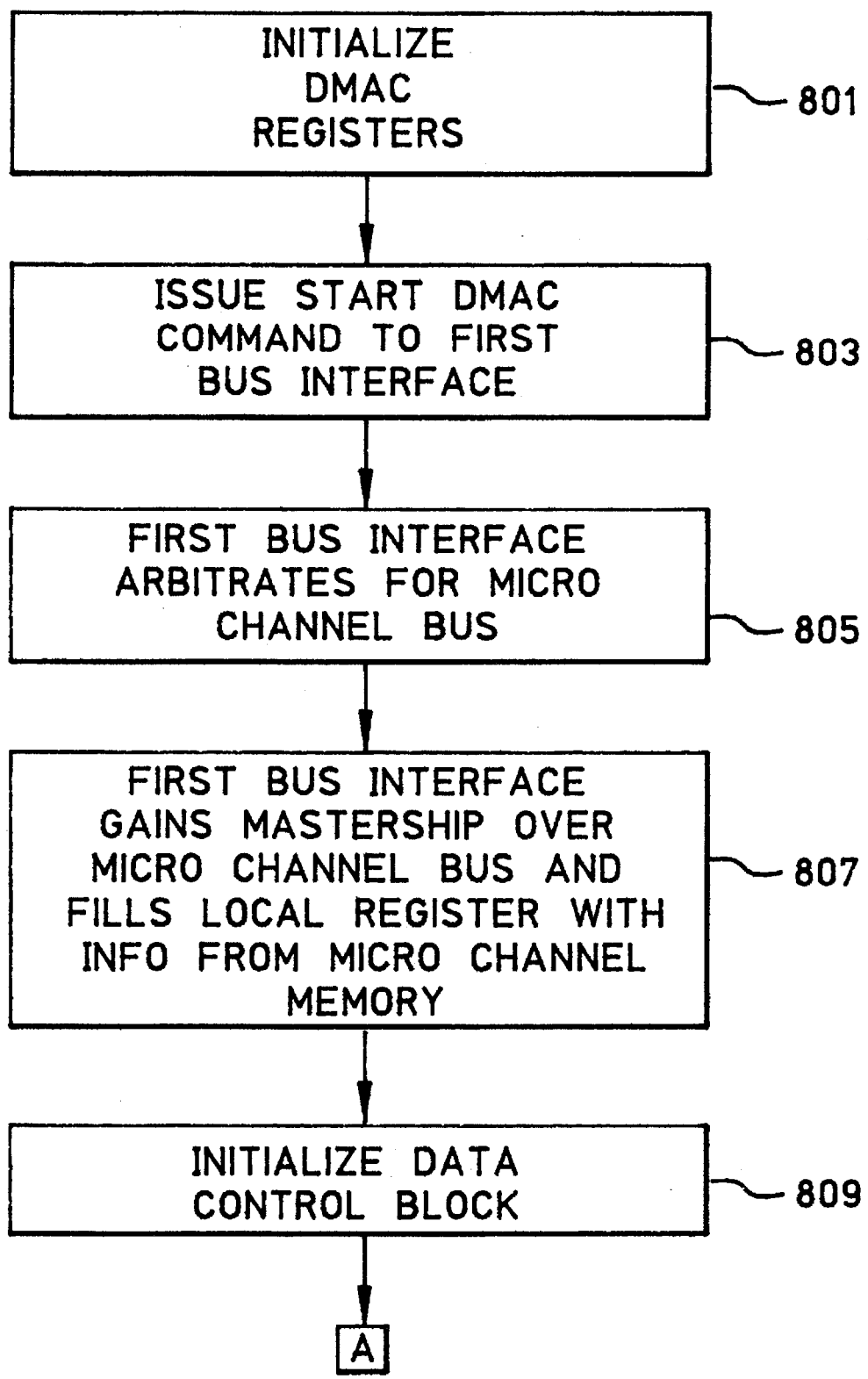
FIGS. 8A, 8B, and 8C comprise a flowchart describing a computer implemented procedure for a store operation according to the invention.
Figure 8B:
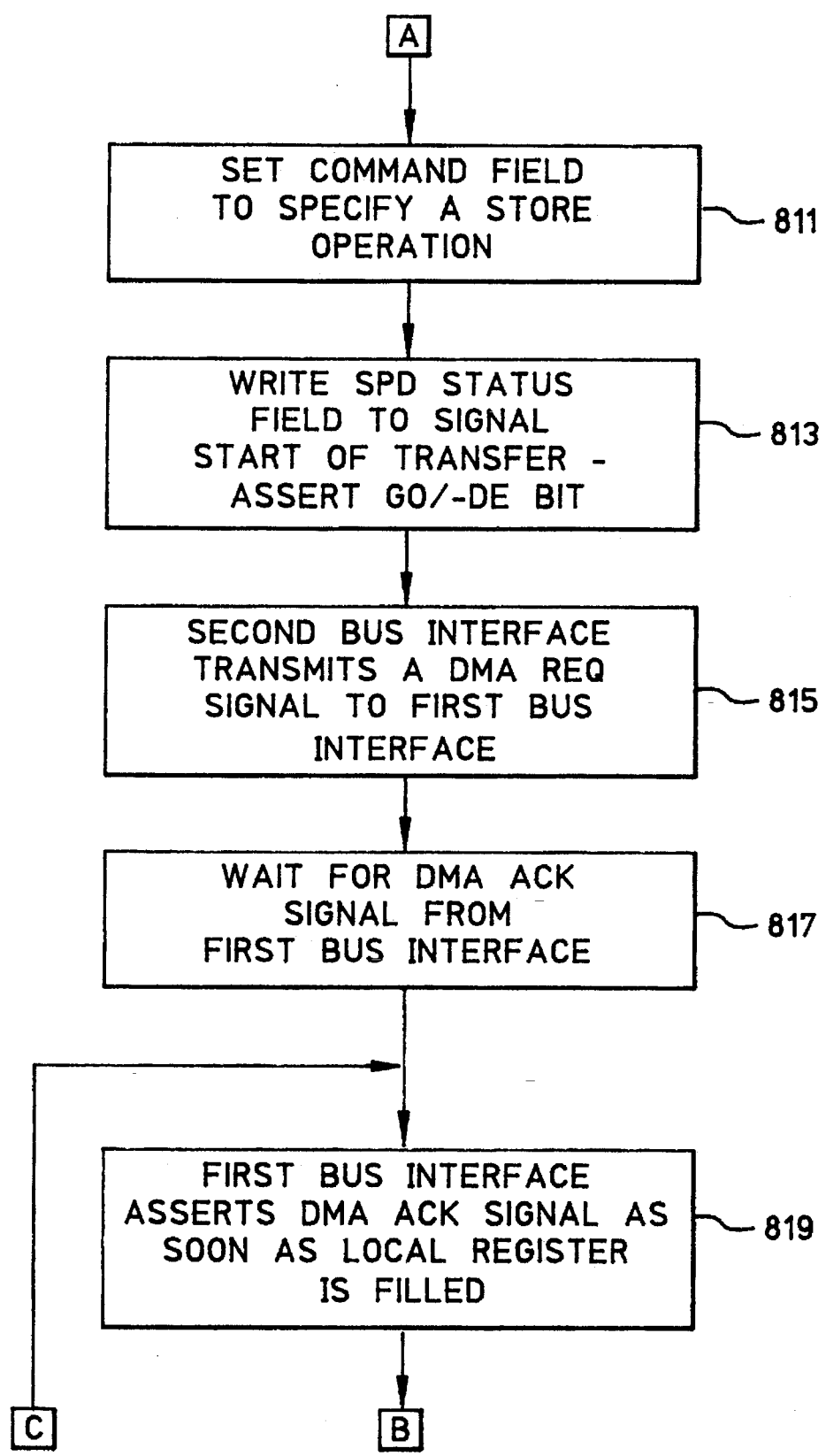
Figure 8C:
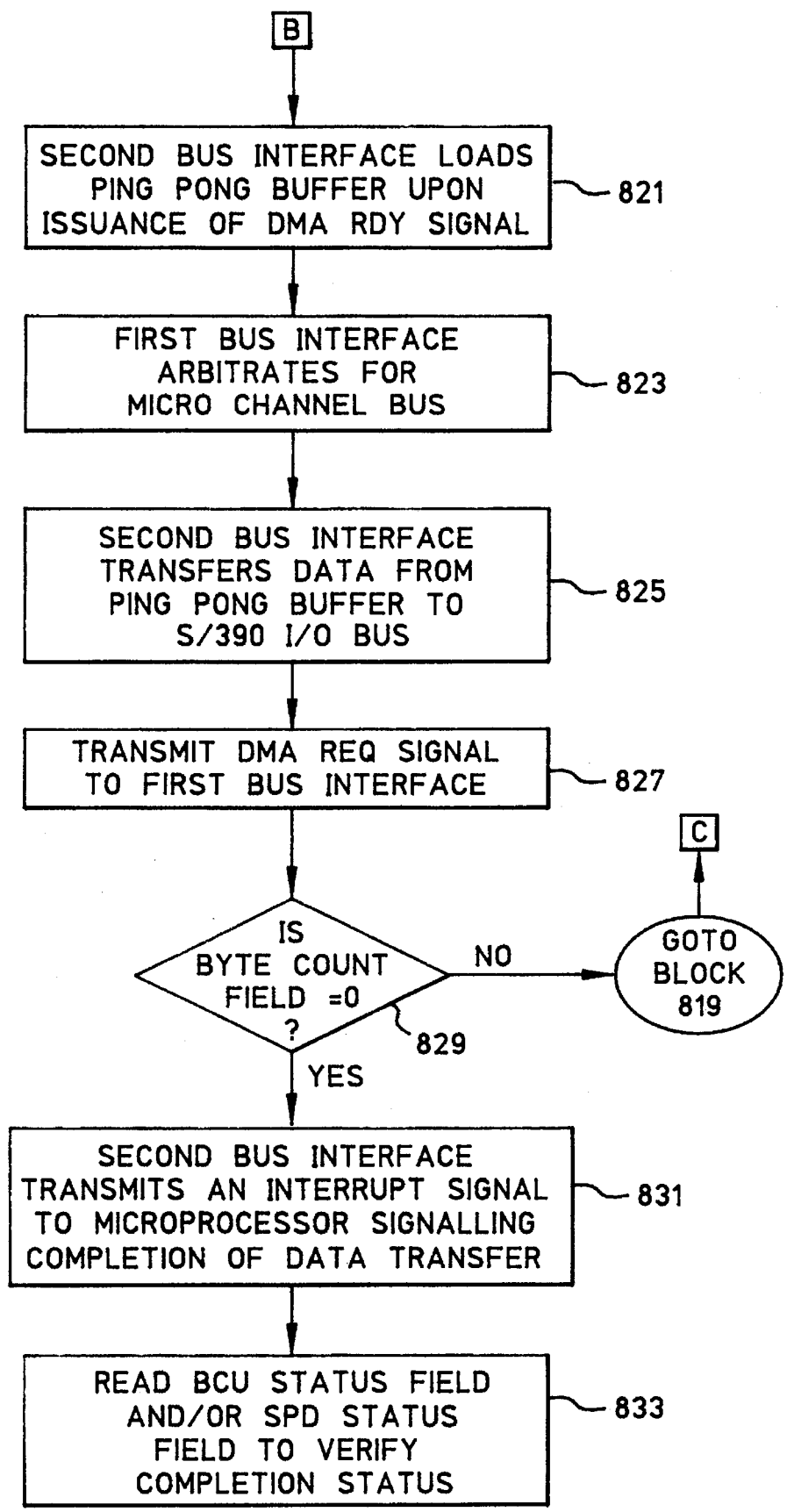

FIG. 8A–8C comprise a flowchart setting forth the operational sequence for a second data processing system 101 (FIG. 1) store operation. This operation transfers data between the Micro Channel memory 126 and the memory unit 104. In a preferred embodiment of the invention, the memory unit 104 is IBM S/390 storage. Program control commences at block 801, where the microprocessor 206 (FIG. 2) initializes the DMAC 247 registers with the following values. The CSAR 249 register is set to equal the Micro Channel memory 126 (FIG. 1) address where the data is to be read from. The CBCR 251 (FIG. 2) register is set to equal the transfer length. The transfer length must be less than or equal to 16 megabytes and more than 4 bytes. If required, the CLLP 255 register must be set to equal the link list address in memory 208. The CCR 257 register is set to specify the transfer mode, which is implicitly a transfer between the bypass bus 230 and either of Micro Channel bus #1 (FIGS. 1 and 2, 118) or Micro Channel bus #2 (FIG. 2, 120).

At block 803, a START DMAC command is issued to the first bus interface 202 (FIG. 2). The first bus interface 202 arbitrates for Micro Channel bus #1 (118) at block 805. After gaining mastership, the first bus interface 202 (FIG. 2) starts filling its local register 245 from the Micro Channel memory 208 (FIG. 8A, block 807). During the performance of blocks 805 and 807, the microprocessor 206 (FIG. 2) initializes the data control block 303 (FIG. 3) with the KEY field 321, the S/390 starting address field 305, and the Byte Count field 307 specified for the transfer to be performed (FIG. 8A, block 809). At block 811, the command field 309 is set to specify a "store" operation.

Next, at block 813 (FIG. 8B), the microprocessor 206 (FIG. 2) writes the adapter status field 319 (FIG. 3) to signal the second bus interface 204 (FIG. 2) to begin the data transfer by asserting the GO/-DE bit. Program control progresses to block 815, where the second bus interface 204 (FIG. 2) transmits a DMA REQ signal to the first bus interface 202, and to block 817 where the program waits for a DMA ACK signal from the first bus interface 202 (FIG. 2).

At block 819, the first bus interface 202 (FIG. 2) asserts a DMA ACK signal as soon as the local register 245 is filled. The second bus interface 204 starts loading the ping pong buffer 241 or 243 upon issuance of the DMA RDY signal (FIG. 8C, block 821). Next, the first bus interface 202 (FIG. 2) arbitrates for Micro Channel bus #1 (118) at block 823. This step is executed soon after the local register 245 (FIG. 2) contents is transferred, so long as the residual byte count is not zero.

During execution of block 823, the second bus interface 204 (FIG. 2) transfers the data from the ping pong buffer 241 or 243 to the S/390 I/O bus 106 (FIG. 8C, block 825). Simultaneously with the execution of blocks 823 and 825, block 827 transmits a DMA REQ signal to the first bus interface 202 (FIG. 2). Program control then progresses to block 829 where a test is performed to see whether the Byte Count field 307 (FIG. 3) is equal to zero. If this field is not equal to zero, the program loops back to block 819. If the Byte Count field 307 (FIG. 3) is zero, program control shifts ahead to block 831 where the second bus interface 204 (FIG. 2) transmits an interrupt to microprocessor 206, indicating the completion of data transfer. At block 833, the microprocessor 206 (FIG. 2) may read the transfer status field 317 and/or the adapter status field 319 (FIG. 3) to verify the completion status, if desired.

The smart bus control unit 112 (FIG. 2) of the present invention is capable of implementing transfers between control unit memory 208 and Micro Channel memory 126 (FIG. 1) or I/O adapter memory. These transfers are performed in two steps. First, the data are transferred from the local processor bus to the first bus interface 202 (FIG. 2). The local processor bus includes transceivers 224 and 228, as well as buses 222, 226, 230, 232, and 234. Next, the data are transferred from the first bus interface 202 (FIG. 2) to Micro Channel bus #1 (118). These transfers may be accomplished by using any one of three techniques: (1) using the DMAP 901 facility within the first bus interface 202 (FIG. 2); (2) using DMAC 247 explicit mode facilities in the first bus interface 202; and (3) Micro Channel 103, 105 (FIG. 1) accessing the control unit memory 208 as a memory slave. The DMAC 247 explicit mode facilities have been described previously in conjunction with data transfers between S/390 storage (memory unit 104) and Micro Channel memory 126 (FIG. 1). However, the first bus interface arbitrates for the mastership on the local processor bus and transfers the data to or from the control unit memory 208.

The technique of implementing data transfers with the DMAP facility 901 operates as follows. With reference to FIG. 2, the DMAP facility 901 includes a system address register (PSAR) 903, a data register (DATA) 905, a control register (PCR) 907, and a status register (PSR) 909. The microprocessor 206 (FIG. 2) may directly transfer up to four bytes of data, to or from Micro Channel memory 126 (FIG. 1) space by programming the PSAR (FIG. 2) register 903, the DATA register 905, and the PCR register 907 for writes.

The microprocessor 206 issues a START DMAP command. The first bus control unit 202 then gains control of the Micro Channel 103, 105 (FIG. 1), and transfers up to four bytes of data to or from the DATA register 905 (FIG. 2), from or to Micro Channel bus 118, 120 (FIG. 1) or Micro Channel memory 126 space, as determined by the values of the PSAR register 903 and the PCR register 907 (FIG. 2).

During DMAP 901 write transfer initialization, the DATA register 905 must be aligned with the Micro Channel 103, 105 (FIG. 1) address loaded into the PSAR register 903 (FIG. 2) and the transfer count value loaded into the PCR register 907. During DMAP 901 read cycles, the first bus interface 202 accesses up to four bytes of read data, on a word-aligned basis, dependent upon the starting byte address indicated by the two least significant PSAR register 903 bits and the PCR register 907 transfer count (i.e., up to four bytes from address 0, up to three bytes from address 1, etc.).

When the data transfer has concluded, the first bus interface 202 sets the ending status into the PSR register 909. An end interrupt status may also be set at this time. The conclusion of DMAP 901 transfer may be ascertained by servicing the first bus interface 202 interrupt request, or by polling a DMAP BUSY bit in the PSR 909.

The Micro Channel 103, 105 (FIG. 1) may access the control unit memory 208 (FIG. 2) as a memory slave. The memory 208 is mapped into Micro Channel memory 126 (FIG. 1) address space. The first bus interface 202 (FIG. 2) asserts a CHREADY signal when the Micro Channel 103, 105 (FIG. 1) accesses memory 126. The first bus interface 202 (FIG. 2) arbitrates for the local processor bus, using HOLD and HOLDA protocol. When the first bus interface 202 obtains the mastership, it completes the transfer operation and negates the CHREADY signal to terminate the Micro Channel 103, 105 (FIG. 1) cycle. These access operations are always only two bytes in length, because the first bus interface 202 (FIG. 2) responds as a 16-bit slave to the Micro Channel 103, 105 (FIG. 1).

A number of specific embodiments of the present invention have been described. Nevertheless, it will be understood that various modifications and changes may be made without departing from the spirit and scope of the invention.

What is claimed is:

1. A smart bus control unit for coupling a mainframe computer to a personal computer, wherein the personal computer includes an I/O channel providing a communications path for at least one of data, control information, and address information and including a first I/O bus, at least one PC processor, and at least one I/O adapter, and wherein said mainframe computer includes a central processing unit coupled to a second I/O bus and a memory unit, said smart bus control unit comprising:

a local bus;

a memory electrically coupled to the local bus;

a first bus interface electrically coupled to the local bus and the first I/O bus, comprising:

a local register to exchange signals between the first I/O bus and a second bus interface via the local bus;

a DMA register operable in a direct program control mode to receive and store parameters for signal transfer operations from the PC processor, and also operable in linked-list mode to obtain parameters for signal transfer operations from the memory and store the parameters;

said first bus interface being selectively operable as a master or a slave in relation to the first I/O bus;

said first bus interface being operable to exchange signals, in accordance with the parameters stored in the DMA register, between the second bus interface and one of the following via the local bus:

(1) the first I/O bus;

(2) a planar processor included in the first I/O channel;

(3) an I/O adapter included in the first I/O channel;

(4) a channel memory included in the first I/O channel; and (5) an I/O device included in the first I/O channel;

a second bus interface electrically coupled to the local bus and the second I/O bus, comprising:

at least two ping-pong buffers to alternately exchange successive signals between the second I/O bus and the local register via the local bus; and a high priority memory to interrupt exchanging of signals by the ping-pong buffer by exchanging signals between the second I/O bus and the local register via the local bus; and a local processor means electrically coupled to the local bus and programmed for initiating exchanging of signals by the first bus interlace and second bus interface in accordance with the parameters stored in the DMA register.

2. The smart bus control unit of claim 1, wherein the first bus interface selectively provides data streaming between the local bus and the first I/O bus.

3. The smart bus control unit of claim 1, wherein the first bus interface operates simultaneously with respect to the second bus interface.

4. The smart bus control unit of claim 1, wherein the DMA register comprises multiple control registers.

5. The smart bus control unit of claim 1, wherein the memory includes RAM.

6. The smart bus control unit of claim 1, wherein the local bus further includes a bypass bus interconnecting the first and second bus interfaces.

7. The smart bus control unit of claim 6, wherein the first bus interface is further programmed to exchange signals, in accordance with commands stored in the DMA register, between the second bus interface and an I/O device included in the first I/O channel such that the signals pass through the bypass bus and the first bus interface bypassing the memory.

* * * * *